United States Patent [19]

Henderson et al.

[11] 4,027,001

[45] May 31, 1977

[54] PROCESS FOR RECOVERING SULFUR FROM SULFUR DIOXIDE

[75] Inventors: James M. Henderson, New Brunswick; John B. Pfeiffer, South Plainfield, both of N.J.

[73] Assignee: Asarco Incorporated, New York, N.Y.

[22] Filed: Apr. 12, 1976

[21] Appl. No.: 676,189

Related U.S. Application Data

[63] Continuation-in-part of Ser. Nos. 584,670, June 6, 1975, and Ser. No. 584,671, June 6, 1975, abandoned.

[52] U.S. Cl. ............................... 423/570; 423/564
[51] Int. Cl.² ........................................ C01B 17/04
[58] Field of Search ................. 423/564, 567, 570

[56] References Cited

UNITED STATES PATENTS

| | | | |
|---|---|---|---|
| 1,880,741 | 10/1932 | Boswell | 423/567 |
| 1,967,263 | 7/1934 | Rosenstein | 423/570 |
| 3,653,833 | 4/1972 | Watson et al. | 423/570 |
| 3,888,970 | 6/1975 | Haas et al. | 423/570 X |

*Primary Examiner*—G. O. Peters
*Attorney, Agent, or Firm*—R. J. Drew; E. J. Schaffer

[57] ABSTRACT

Decrepitation of the catalyst occurring in the initial upstream portion of the catalyst bed of the reaction zone in a process for catalytically reducing sulfur dioxide to obtain elemental sulfur is avoided or minimized by employing as the catalyst in at least the initial upstream portion of the bed a supported sulfate of an iron group metal.

12 Claims, 1 Drawing Figure

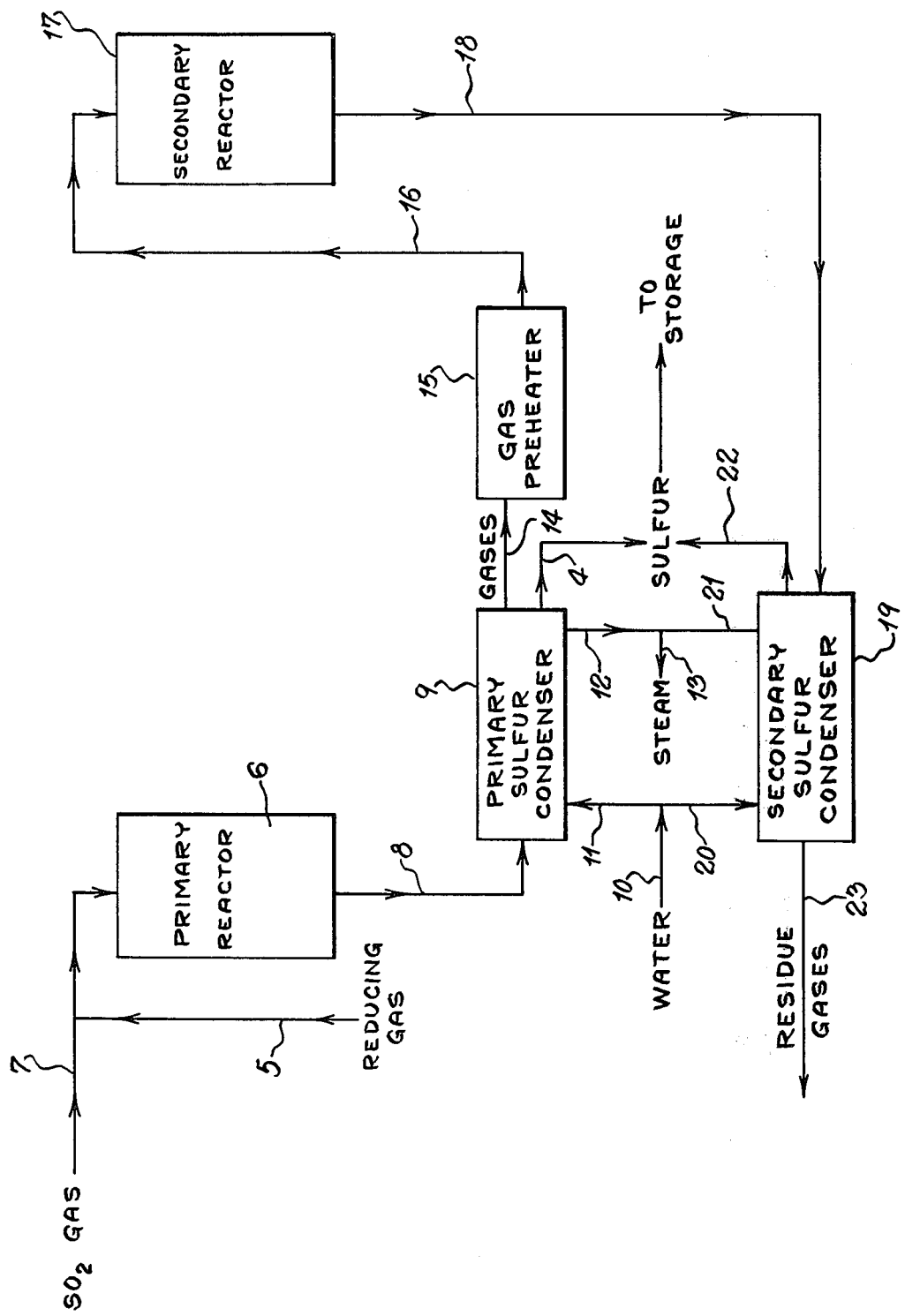

PROCESS FOR RECOVERING SULFUR FROM SULFUR DIOXIDE

CROSS REFERENCES TO RELATED APPLICATIONS

This is a continuation-in-part of our co-pending U.S. patent applications Ser. No. 584,670, filed June 6, 1975 and Ser. No. 584,671, filed June 6, 1975, now abandoned.

BACKGROUND OF THE INVENTION

1. Field of the Invention

This invention relates to the production of elemental sulfur and more particularly to a new and improved process for the recovery of sulfur from sulfur dioxide.

2. Description of the Prior Art

Legislation enacted in certain states requires the removal of a considerable portion of the sulfur dioxide from the off gases of copper smelters, prior to discharge of the gases into the atmosphere. Sulfur dioxide is currently removed from the sulfur dioxide-containing off gases of copper smelters in accordance with one process by absorbing the $SO_2$ gas in a liquid organic base such as an aromatic amine, e.g. N,N-dimethylaniline, by contacting the sulfur dioxide-containing off gases or off gas with the liquid N,N-dimethylaniline absorbent, and then stripping the $SO_2$ gas from the pregnant absorbent. The thus released $SO_2$ gas is converted into liquid $SO_2$.

The conversion of the $SO_2$ gas into sulfuric acid at the smelter tends to pose certain problems. Considerably more sulfuric acid can usually be produced in the smelter acid plants than can be disposed of in the marketing areas available to the smelters. It is not practical to ship sulfuric acid to the distant markets due to the appreciable expense of transporting the acid, and unlimited storage facilities for the acid is also impractical due to the appreciable expense, hazards posed, etc. Disposal of the excess sulfuric acid by dumping the acid onto the ground is ordinarily not a satisfactory solution as this means of disposal may pose pollution problems and also may pose safety problems due to the highly corrosive nature of the acid.

U.S. Pat. No. 1,880,741 discloses the reduction of sulfur dioxide to elemental sulfur by passing the sulfur dioxide and a hydrogen-containing gas over a partly reduced sulfide of iron, nickel or cobalt as catalyst at an elevated temperature of about 180° to about 300° C. The catalyst can be prepared by heating a sulfate of iron, nickel or cobalt, or any mixture of these compounds to a high temperature, preferably about 600° C., then lowering the temperature and passing sulfur dioxide and hydrogen or sulfur dioxide followed by hydrogen over the catalyst. U.S. Pat. No. 3,149,920 relates to the production of sulfur from sulfur dioxide by adding sulfur dioxide to a gas stream containing hydrogen sulfide, and passing the resultant gaseous mixture over an initially anhydrous bed of catalyst at a temperature in the range from about 25° C. to about 200° C. in the presence of a hydrocarbon solvent. The catalyst can be silica, alumina, silica-alumina, silica-zirconia, silica-alumina-zirconia, silica-magnesia, silica-boria and silica-magnesia-alumina. U.S. Pat. No. 1,773,293 discloses the production of elemental sulfur by passing a gas mixture containing hydrogen sulfide, sulfur dioxide and ammonia vapor in contact with activated bauxite at temperatures below 200° C. U.S. Pat. No. 3,454,355 discloses the removal of sulfur dioxide and nitrogen oxides from gaseous mixtures by contacting the gaseous mixture at a temperature of at least 750° F. with cobalt, nickel, slver, molybdenum, copper, palladium or alumina as catalyst, in the presence of carbon monoxide in an amount at least 0.75 of the stoichiometric amount necessary to reduce the sulfur dioxide and other oxidizing gases in the gaseous mixture. U.S. Pat. No. 2,361,825 relates to the reduction of sulfur dioxide to elemental sulfur and hydrogen sulfide by contacting the sulfur dioxide-containing gas at a temperature from 600° to 2400° F. with hydrogen and, as catalyst, a sulfide of iron, cobalt or nickel supported on aluminum oxide.

We found that the use of a supported oxygen-containing compound of a metal of the iron group pf Group VIII of the Periodic Table which was capable of undergoing a significant increase in its molecular volume during the contacting of the gas mixture comprising sulfur dioxide, carbon monoxide and hydrogen therewith, such as cobalt oxide, as catalyst in the first stage reaction zone was unsatisfactory due to decrepitation and crumbling of the supported catalyst in the initial upstream, high heat-release portion of the first stage reactor tubes. The high heat-release, which occured in the first approximately 10 to 12 inch length of the reactor tubes of the first stage reaction zone, was accompanied by the relatively low molecular volume cobalt oxide being converted to the relatively high molecular volume cobalt sulfate with attendant decrepitation and crumbling of the supported catalyst. The catalyst fines produced by the crumbling resulted in disadvantageous packing of the powdered catalyst or fines and blockage of gas flow therethrough.

BRIEF SUMMARY OF THE INVENTION

In accordance with this invention, a considerable improvement is provided in the known process for recovering elemental sulfur by catalytic reduction and comprising contacting a gas mixture comprising sulfur dioxide, hydrogen and carbon monoxide in a reaction zone with a supported metal catalyst wherein the metal is of Group VIII of the Periodic Table, at a reaction temperature, and recovering elemental sulfur from the resulting gas mixture comprising sulfur vapor, residual sulfur dioxide and hydrogen sulfide. The improvement comprises supplying or utilizing as the catalyst in at least the initial upstream, high heat-release portion of the reaction zone a supported sulfate of an iron group metal of Group VIII whereby decrepitation of the supported catalyst is eliminated or substantially eliminated in the initial upstream, high heat-release portion of the reaction zone.

The sulfate of the iron group metal is in its highest or substantially highest molecular volume state at the outset of the contacting therewith of the gas mixture comprising sulfur dioxide, carbon monoxide and hydrogen and is incapable of undergoing any signifiant increase in molecular volume during the contacting of such gas mixture therewith in the reaction zone under the conditions prevailing in such zone.

The catalyst in the remaining downstream portion of such reaction zone is preferably also the sulfate of the iron group metal of Group VIII. Alternatively and less preferably, the catalyst in the remaining downstream portion of such reaction zone can be a supported oxide of the iron group metal and/or a supported sulfide of the iron group metal. The supported oxide of the iron group metal and the supported sulfide of the iron group metal are each capable of undergoing a significant increase or expansion in its molecular volume during the contacting of the gas mixture therewith.

In accordance with one embodiment of the invention, the process comprises a. contacting a gas mixture comprising sulfur dioxide, hydrogen and carbon monoxide and usually also carbon dioxide, water vapor, and nitrogen with a catalyst in a first stage reaction zone at a reaction temperature to reduce a substantial portion of the sulfur dioxide to elemental sulfur and also form hydrogen sulfide and carbonyl sulfide, without any substantial decrepitation of the catalyst in an initial upstream portion of the catalyst bed or elsewhere in the catalyst bed, a high heat release occurring in the initial up-stream portion of the catalyst bed;

b. the catalyst of the initial upstream portion of the catalyst bed of the first stage reaction zone being a supported sulfate of an iron group metal of Group VIII of the Periodic Table which is in its highest molecular volume state at the outset of the contacting of the gas mixture therewith and which is incapable of undergoing substantially any increase in molecular volume with attendant decrepitation thereof during the contacting of the gas mixture therewith, the remaining downstream portion of the catalyst bed of the first reaction stage being a supported sulfide of a metal of and/or oxide of a metal of the iron group of Group VIII of the Periodic Table which is of relatively low molecular volume and which is capable of undergoing a significant or substantial increase in its molecular volume during the contacting of the gas mixture therewith;

c. cooling the gas mixture from the first reaction stage to condense the elemental sulfur;

d. removing the condensed, liquid elemental sulfur from the gas mixture and collecting the condensed elemental sulfur;

e. contacting the thus-treated gas mixture comprising residual sulfur dioxide, hydrogen sulfide, carbonyl sulfide, carbon dioxide, water vapor and usually also nitrogen in a second state reaction zone at a reaction temperature with a catalyst for the reaction of sulfur dioxide and hydrogen sulfide to produce elemental sulfur in known manner to thereby obtain additional elemental sulfur by reaction of the sulfur dioxide with the hydrogen sulfide;

f. cooling the gas mixture from the second stage reaction zone to condense the elemental sulfur; and g. removing the condensed liquid elemental sulfur from the gas mixture from the second stage reaction zone and collecting the condensed elemental sulfur.

In step (e) of such process, sulfur dioxide may also react with carbonyl sulfide to produce elemental sulfur.

In accordance with another embodiment of the invention, the process is the same as that disclosed immediately above in steps (a) through (g) inclusive except that the catalyst in the remaining downstream portion of the catalyst bed in the first stage reaction zone is a supported sulfate of the iron group metal of Group VIII instead of the supported sulfide and/or oxide of the iron group metal.

The elimination of the decrepitation of the supported catalyst in the initial upstream portion of the catalyst bed of the first stage reaction zone by employing as catalyst in such initial upstream portion a sulfur-and oxygen-containing compound of the iron group metal which is in its highest or substantially highest molecular volume state at the outset of the process, such as cobalt sulfate, was entirely unexpected.

The catalyst of the initial upstream portion of the catalyst bed of the first stage reaction zone wherein the high heat release occurs, for example the first approximately 9 to 15 inches of the length of the upstream portion of the catalyst bed, of the first stage reaction zone, which is the supported sulfate of the iron group metal of Group VIII of the Periodic Table characterized by having a relatively high molecular volume at the outset of the contacting therewith of the gas mixture comprising sulfur dioxide, carbon monoxide and hydrogen and usually also carbon dioxide, water vapor and nitrogen and which is incapable of undergoing any significant increase in its molecular volume during the contacting of such gas mixture therewith, is exemplified by cobalt sulfate, iron sulfate, and nickel sulfate. The exact length or dimensions of the initial upstream portion of the first stage reaction zone wherein the high heat release occurs is dependent on the configuration and dimensions of the first stage reactor and can be shorter or longer than the approximately 9 to 15 inch length set forth immediately above. The catalyst in the remaining downstream portion of the first stage reaction zone in the one embodiment, which is the supported sulfide and/or oxide of the iron group metal of Group VIII characterized by having a relatively low molecular volume at the outset of the contacting therewith of the gas mixture comprising sulfide dioxide, hydrogen and carbon monoxide and usually also carbon dioxide, water vapor and nitrogen and which is capable of undergoing a significant increase in its molecular volume, is exemplified by cobalt oxide, iron oxide, nickel oxide, cobalt sulfide, iron sulfide and nickel sulfide. The catalyst in the remaining downstream portion of the first stage reaction zone in the other embodiment, which is the supported sulfate of the iron group metal of Group VIII, is exemplified by cobalt sulfate, iron sulfate, and nickel sulfate.

During the catalytic contacting of the gas mixture in the first stage reaction zone, the relatively high molecular volume sulfur-and oxygen-containing compound of the iron group metal, for example cobalt sulfate, of the supported catalyst in the initial upstream portion of the first stage reaction zone, which is the portion of the first stage reaction zone wherein the high heat release occurs, is reduced at least partially to the sulfide of the iron group metal, for instance cobalt sulfide, which is of relatively low molecular volume. This reduction or "coming down" in molecular volume of the catalyst which was distributed throughout the catalyst pellet or other shape together with the support or carrier, in the initial upstream, high heat release portion of the first stage reaction zone does not result in decrepitation or crumbling of the supported catalyst in this portion of such reaction zone. On the contrary, when we employed a supported catalyst of relatively low molecular volume, such as cobalt oxide, on the support, a significant portion of the cobalt oxide was increased or "went up" in molecular volume in the initial upstream, high heat release portion of the first stage reaction zone by being converted to cobalt sulfate with attendant crumbling of this catalyst. This crumbling, which was highly undesirable, was attributed to the swelling of the catalyst, which was distributed throughout the catalyst pellet or other shape together with the support, due to expansion in forming the cobalt sulfate from cobalt oxide. The crumbling or decrepitation of the catalyst, which was previously a gas-pervious bed of the supported catalyst, resulted in packing of the resulting powdered supported catalyst and blockage of the gas flow therethrough.

By "molecular volume" as used herein in describing the iron group metal compound of the supported catalyst of this invention is meant the volume occupied by one typical molecule of such iron group metal compound. The molecular volume is readily calculated by dividing the gram molecular weight of such iron group metal compound by the product of its density times Avogadros number, $6.0225 \times 10^{23}$.

The support for the catalyst in the first stage reaction zone can be any suitable support or carrier, and the support may itself be catalytically active. We have obtained good results with the use of alumina as support, and preferably gamma alumina or a mixture of gamma alumina and theta alumina as support. The support or carrier can be of any suitable form, for example as pellets, extrudates or balls.

The supported cobalt sulfate, iron sulfate and nickel sulfate catalyst of this invention is readily obtainable in commerce. The supported cobalt oxide, iron oxide, nickel oxide, cobalt sulfide, iron sulfide and nickel sulfide catalysts are also readily obtainable in commerce.

The catalyst utilized in the second stage reaction zone herein is any catalyst capable of catalyzing the reaction of $SO_2$ and $H_2S$ to yield elemental sulfur, and is sometimes referred to herein as a Claus catalyst or a Claus process catalyst. Such catalyst is exemplified by bauxite and activated alumina. These catalysts are also readily obtainable in commerce. Such catalyst was obtained as irregularly-shaped lumps of approximately ⅛ to ¼ inch diameter.

A small amount of clay can, if desired, be incorporated in or mixed together with the catalyst support of the catalyst utilized in the first stage reaction zone. The amount of clay incorporated therein is an amount which is sufficient to impart mechanical strength to the supported catalyst.

The reducing gas comprising $H_2$ and CO utilized herein can be obtained in known manner by any of: the catalytic partial combustion of natural gas, the steam reforming of natural gas, the partial combustion of petroleum distillates, or the partial combustion of fuel oils. Water gas or producer gas also could be used herein as the reducing gas.

The inlet temperature of the gas mixture to the first stage reaction zone, i.e. primary reactor, is usually in the range from about 300° to about 450° C., and the outlet temperature of the gas from the first stage reaction zone is usually in the range from about 300° to about 450° C. In between the inlet and outlet of the first stage reaction zone, the temperature of the gas was in the range of about 300° C. to considerably higher than 450° C. and as high as about 700° C. The highest gas temperatures were ordinarily in the initial upstream portion of the catalyst bed, and in the first approximately 9 to 15 inches length of the catalyst bed with the particular configuration of first stage reactor employed which was a tube and shell reactor wherein the tubes were of 1.041 inch inner diameter and 0.109 wall thickness. The inlet temperature of the gas into the second stage reaction zone, i.e. secondary reactor, which is the Claus reactor, is usually in the range of about 245° to about 275° C. The outlet temperature of the gas from the second stage reaction zone is usually in the range of about 210° to about 260° C.

The mass velocity of the gas flow into the first stage reaction zone is usually in the range of about 5 lbs. per minute per square foot to about 18 lbs. per minute per square foot. The mass velocity of the gas flow into the second stage reaction zone is typically in the range of about 2 lbs. per minute per square foot to about 12 lbs. per minute per square foot.

The following main reactions are postulated to take place in the first stage reaction zone, i.e. primary reactor, the heats of reaction for the reactions also being set forth below:

|     |     | $\Delta H$ (reaction) at 700° K. BTU/lb mol |
| --- | --- | --- |
| (1) | $SO_2 + 2H_2 \rightarrow 1/2S_2 + 2H_2O$ | − 56,000 |
| (2) | $SO_2 + 3CO \rightarrow COS + 2CO_2$ | −127,000 |
| (3) | $COS + 1/2SO_2 \rightarrow 3/4S_2 + CO_2$ | − 6,800 |
| (4) | $SO_2 + 2H_2S \rightarrow 3/2S_2 + 2H_2O$ | − 18,000 |
| (5) | $SO_2 + 3H_2 \rightarrow H_2S + 2H_2O$ | − 93,000 |

The high heat release in the initial formation of carbonyl sulfide, shown by reaction (2), caused higher temperatures in the initial upstream portion of the catalyst bed.

The process herein is suitable for treatment of sulfur dioxide gas having a wide range of $SO_2$ concentration, e.g. gas ranging in $SO_2$ content from 12 to 100% by volume.

BRIEF DESCRIPTION OF THE DRAWING

The accompanying drawing is a diagrammatic representation of apparatus for carrying out the invention.

DETAILED DESCRIPTION OF THE DRAWING

Reducing gas comprising $H_2$ and CO is supplied through line 5 and introduced into primary or first stage catalytic reactor 6. The reducing gas usually also contains $CO_2$, $N_2$ and $H_2O$ and has a composition of typically about 27 to 33% $H_2$, about 15 to 18% CO, about 1.3 to 1.4% $CO_2$, about 44 to 49% $N_2$ and about 3 to 7% $H_2O$. The reducing gas was obtained by the catalytic partial combustion of natural gas with preheated air to yield a reformed gas stream comprising $H_2$ and CO and having the approximate composition set forth immediately above. A $SO_2$ gas stream, for example an $SO_2$-containing gas stream having $SO_2$ content of typically about 12% by volume, or a pure or substantially pure $SO_2$ gas stream, is supplied through line 7 and mixed with the reducing gas stream prior to its introduction into primary reactor 6. Reactor 6 was a vertical shell and tube heat exchanger with the tubes filled with a gas-pervious mass of supported catalyst pellets. Inasmuch as the reduction of $SO_2$ is highly exothermic, Dowtherm A organic heat transfer liquid was circulated through the shell side of primary reactor 6 to control the reactor temperature. In the shell side of primary reactor 6 and during the course of cooling or controlling the reactor temperature, the heat transfer liquid was partially vaporized. A mixture of the heated heat transfer liquid and vapor leaving the primary reactor 6 was passed to an expansion drum where the two phases were separated. A controlled amount of the vapor from the expansion drum was passed through an air-cooled condenser where it was condensed with the condensate being returned to the expansion drum. The heat transfer liquid from the expansion drum, at a temperature substantially corresponding to the boiling point at system pressure, was split into two streams, one such stream being returned to the primary reactor 6 for cooling purposes and the other stream being circulated back to the expansion drum through a shell-and-tube heat exchanger 15 where it served to reheat the process gas stream from the primary sulfur condenser 9 prior to its introduction into the second stage catalytic reactor or secondary reactor 17.

The catalyst in the first approximately 10 to 12 inches of the catalyst bed in the tubes of first stage reactor 6 at the outset of the contacting of the gas mixture therewith was a sulfur-and oxygen-containing compound of cobalt, such as cobalt sulfate, supported on pellets of activated alumina. The catalyst in the remaining downstream portion of the catalyst bed in the tubes of first stage reactor 6 at the outset of the catalytic contacting of the gas mixture therewith was a sulfur-containing compound and/or oxygen-containing compound such as cobalt oxide and/or cobalt sulfide. Alternatively, the catalyst in the remaining downstream portion of the catalyst bed in the tubes of first stage reactor 6 can be the supported sulfate of the iron group metal, e.g. cobalt sulfate. The inlet temperature of the gas mixture to the primary reactor 6 was in the range of 300° to 450° C.

The gases or gas mixture exiting from primary reactor 6 is at an elevated temperature typically in the range of 300° to 450° C. and is essentially at equilibrium, which at operating temperature and pressure amounts to conversions of $SO_2$ to elemental sulfur vapor of approximately 69% when the $SO_2$ feed gas has a $SO_2$ content of 12% by volume and approximately 80% when the $SO_2$ feed gas is pure $SO_2$. The gases exiting from primary reactor 6 and containing elemental sulfur vapor and hydrogen sulfide and sulfur dioxide, the last two constituents being present therein in a mol ratio of approximately 2:1 respectively, pass through line 8 to primary sulfur condenser 9, which was a horizontal shell and tube condenser, wherein the gas mixture is cooled sufficiently and considerably below the dew point and close to but above the freezing point of elemental sulfur, typically to about 10° – 15° F. above the freezing or melting point of elemental sulfur, to condense liquid elemental sulfur from the gas mixture. The liquid elemental sulfur flows by gravity from condenser 9 through line 4 to a concrete-lined storage pit (not shown). Boiler feed water is supplied through lines 10 and 11 to condenser 9 for indirect cooling of the gas mixture in condenser 9 to condense out the liquid elemental sulfur, and steam is withdrawn from condenser 9 via lines 12 and 13. Most of the elemental sulfur is liquefied and removed from the gas mixture in primary condenser 9.

The gases containing hydrogen sulfide and sulfur dioxide from primary sulfur condenser 9 pass through line 14 to preheater 15 wherein the gases are reheated to a temperature typically in the range of 245° to 275° C. to avoid condensation of sulfur vapor on the catalyst employed in the secondary reactor 17, after which the reheated gases pass via line 16 to second stage reactor or secondary reactor 17. Secondary reactor was a fixed-bed Claus-type catalytic reactor with no internal cooling provided. The gases contact a fixed bed of Claus catalyst, for example activated alumina, in passing through reactor 17 whereby the hydrogen sulfide and sulfur dioxide react to yield additional elemental sulfur vapor.

The resulting gas mixture exits from secondary reactor 17 at a temperature typically in the range of 210° to 260° C. and passes via line 18 to secondary sulfur condenser 19, which was a horizontal shell and the tube condenser, wherein the gas mixture is cooled sufficiently and appreciably below the dew point and close to but above the freezing point of elemental sulfur, typically to about 10° – 15° F. above the freezing or melting point of elemental sulfur, to condense liquid elemental sulfur from the gas mixture. Boiler feed water is supplied to secondary condenser 19 through lines 10 and 20 for indirect cooling of the gas mixture in condenser 19 to condense out the liquid elemental sulfur and steam is withdrawn from condenser 19 through lines 21 and 13. All or substantially all of the elemental sulfur is liquefied and removed from the gas mixture in condenser 19. The liquid elemental sulfur flows by gravity from condenser 19 through line 22 to the concrete-lined storage pit (not shown). Residue containing residual $H_2S$ and traces of sulfur vapor flow from condenser 19 through line 23 to an incinerator where the $H_2S$ and sulfur vapor is burned prior to exhausting the gases to the atmosphere.

DESCRIPTION OF THE PREFERRED EMBODIMENTS

The preferred catalyst in the initial upstream, high heat release portion of the first stage reaction zone at the outset of the process is supported cobalt sulfate. The cobalt sulfate is reduced in part during the catalytic contacting to cobalt sulfide. The preferred catalyst in the remaining downstream portion of the first stage reaction zone at the outset of the process is supported cobalt sulfate.

The preferred catalyst support in the entire first stage reaction zone is gamma alumina or a mixture of gamma alumina and theta alumina, more preferably gamma alumina.

Preferably the inlet temperature of the gas into the first stage reaction zone is in the range from about 325° to about 375° C., and the outlet temperature of the gas from the first stage reaction zone is in the range from about 325° to about 375° C.

In carrying out the process of this invention in test runs, the catalyst utilized in the tubes of the reactor including in the initial upstream portion of the tubes wherein the high heat release occurs was cobalt oxide on alumina in the form of pellets. The catalyst pellets in the first approximately 10 to 12 inch length of such tubes, which was substantially the zone of high heat release, underwent premature decrepitation and crumbling during the catalytic contacting of the gas mixture comprising the $SO_2$, $H_2$ and $CO$ in the primary reactor with consequent undesirable packing of the catalyst and blockage of gas flow. However, when cobalt sulfate on alumina pellets were substituted for the cobalt oxide on alumina pellets in the first approximately 10 to 12 inch length of the tubes of the primary reactor, with the catalyst in the remaining length of such tubes being cobalt oxide on alumina pellets, no significant decrepitation and crumbling of the catalyst pellets occurred in the zone of high heat release of the tubes, which was the first approximately 10 to 12 inch length of the tubes, or in any other portion of such tubes, no packing of the catalyst occurred, and no blockage of gas flow occurred. When cobalt sulfate on alumina pellets is substituted for all of the cobalt oxide on alumina pellets throughout the entire length of the catalyst bed zone in the tubes of the primary reactor, no significant decrepitation and crumbling of the catalyst pellets occurs in the zone of high heat release of the tubes, or in any other portion of the tubes. Further, no packing of the catalyst occurs, and no blockage of gas flow occurs.

What is claimed is:

1. In a process for the recovery of elemental sulfur by catalytic reduction comprising contacting a gas mixture comprising sulfur dioxide, hydrogen and carbon monoxide in a reaction zone with a supported metal of Group VIII of the Periodic Table as catalyst at a reaction temperature, and recovering elemental sulfur from a resulting gas mixture comprising sulfur vapor, residual sulfur dioxide and hydrogen sulfide, the improvement comprising supplying the catalyst in an initial upstream portion of the reaction zone wherein a high heat release occurs as a supported sulfate of an iron group metal of Group VIII whereby decrepitation of the catalyst is substantially eliminated in the zone of high heat release.

2. The process of claim 1 wherein the gas mixture from the reaction zone contains hydrogen sulfide and residual sulfur dioxide in a mol ratio of approximately 2:1 respectively.

3. The process of claim 2 wherein, subsequent to recovering the elemental sulfur from the gas mixture, the thus-treated gas mixture comprising the hydrogen sulfide and residual sulfur dioxide is contacted in another reaction zone at a reaction temperature with a catalyst to thereby obtain additional elemental sulfur by reaction of the sulfur dioxide with the hydrogen sulfide, and thereafter the elemental sulfur is recovered from the gas mixture.

4. The process of claim 1 wherein the catalyst in the remaining downstream portion of the reaction zone is a supported sulfate of the iron group metal.

5. The process of claim 1 wherein the catalyst in the remaining downstream portion of the reaction zone is a supported oxide of the iron group metal and/or sulfide of the iron group metal.

6. The process of claim 1 wherein the catalyst in the initial upstream portion of the reaction zone is a supported cobalt sulfate.

7. The process of claim 2 wherein the catalyst in the initial upstream portion of the reaction zone is a supported cobalt sulfate.

8. The process of claim 4 wherein the catalyst in the initial upstream portion of the reaction zone is supported cobalt sulfate, and the catalyst in the remaining downstream portion of the reaction zone is cobalt sulfate.

9. The process of claim 1 wherein the catalyst support is alumina.

10. The process of claim 2 wherein the catalyst support is alumina.

11. The process of claim 9 wherein the alumina is gamma alumina.

12. The process of claim 10 wherein the alumina is gamma alumina.

* * * * *

UNITED STATES PATENT OFFICE
CERTIFICATE OF CORRECTION

Patent No. 4,027,001  Dated May 31, 1977

Inventor(s) James M. Henderson and John B. Pfeiffer

It is certified that error appears in the above-identified patent and that said Letters Patent are hereby corrected as shown below:

Page 1, the Assignee should read --ASARCO Incorporated-- instead of "Asarco Incorporated". Column 2, line 4, "slver" should read --silver--. Column 3, line 42, "state" should read --stage--. Column 8, line 7, "the" should be deleted.

Signed and Sealed this

*Twenty-seventh* Day of *December 1977*

[SEAL]

Attest:

RUTH C. MASON  
*Attesting Officer*

LUTRELLE F. PARKER  
*Acting Commissioner of Patents and Trademark*